(12) United States Patent
Smith et al.

(10) Patent No.: US 12,187,354 B2
(45) Date of Patent: Jan. 7, 2025

(54) COAXIAL BEVERAGE KEG CONNECTOR COMPRISING A BALL JOINT

(71) Applicant: JOHN GUEST INTERNATIONAL LIMITED, West Drayton (GB)

(72) Inventors: Joshua Smith, West Drayton (GB); Glen Ansell, Edgware (GB)

(73) Assignee: JOHN GUEST INTERNATIONAL LIMITED, Middlesex (GB)

( * ) Notice: Subject to any disclaimer, the term of this patent is extended or adjusted under 35 U.S.C. 154(b) by 504 days.

(21) Appl. No.: 17/288,049

(22) PCT Filed: Oct. 10, 2019

(86) PCT No.: PCT/GB2019/052878
§ 371 (c)(1),
(2) Date: Apr. 23, 2021

(87) PCT Pub. No.: WO2020/084276
PCT Pub. Date: Apr. 30, 2020

(65) Prior Publication Data
US 2021/0387684 A1   Dec. 16, 2021
US 2024/0149956 A9   May 9, 2024

(30) Foreign Application Priority Data

Oct. 24, 2018   (GB) .................................... 1817289

(51) Int. Cl.
*B67D 1/08*     (2006.01)
*B62D 35/00*    (2006.01)
(Continued)

(52) U.S. Cl.
CPC ......... *B62D 35/007* (2013.01); *B67D 1/0829* (2013.01); *H01Q 1/3275* (2013.01);
(Continued)

(58) Field of Classification Search
CPC ...... B67D 1/0829–0851; B67D 1/0857; B67D 1/0867; F16L 27/04–042
See application file for complete search history.

(56) References Cited

U.S. PATENT DOCUMENTS 1,347,470 A * 7/1920 Bard ..................... F16L 27/073
                                                          285/271
1,563,161 A * 11/1925 Christenson .......... F16L 27/053
                                                          285/271
(Continued)

FOREIGN PATENT DOCUMENTS

| GB | 2261042 A | 5/1993 |
|---|---|---|
| WO | 2007031350 A1 | 3/2007 |
| WO | 2010014004 A2 | 2/2010 |

OTHER PUBLICATIONS

International Search Report for International Application No. PCT/GB2019/052878 mailed Feb. 16, 2019 (2 pages).
(Continued)

*Primary Examiner* — Paul R Durand
*Assistant Examiner* — Randall A Gruby
(74) *Attorney, Agent, or Firm* — Barnes & Thornburg LLP

(57) ABSTRACT

An coaxial keg connector comprising a main body (1) made of plastic and having a first inlet port (3) and a second inlet port (3) receiving a stem (2). A coaxial outlet (10) comprises an outer outlet port (11) in communication with the first inlet port (3) and an inner outlet port (12) in communication with the second inlet port. The stem (2) comprises a tubular body with a main axis (31) with an inlet and a connector for attachment to the keg at one end. The second end of the stem opposite to the first end has an outlet in fluid communication with the inner outlet port (12) and comprises a ball joint (61) rotatably mounted in and sealed with respect to the main body (1) so as to be rotatable (12) about the main axis (31)

(Continued)

of the tubular body and rotatable (67, 68) to a limited extent about axes perpendicular to the main axis.

10 Claims, 5 Drawing Sheets

(51) Int. Cl.
 *H01Q 1/32*  (2006.01)
 *H01Q 1/42*  (2006.01)
 *H01Q 5/307*  (2015.01)
 *H01Q 9/04*  (2006.01)
 *H01Q 21/08*  (2006.01)
 *H04B 1/3822*  (2015.01)

(52) U.S. Cl.
 CPC ............. *H01Q 1/42* (2013.01); *H01Q 5/307* (2015.01); *H01Q 9/0407* (2013.01); *H01Q 21/08* (2013.01); *H04B 1/3822* (2013.01)

(56) References Cited

U.S. PATENT DOCUMENTS

| | | | | |
|---|---|---|---|---|
| 1,568,649 A * | 1/1926 | Woodruff | F16L 27/067 | 285/271 |
| 1,669,949 A * | 5/1928 | Reynolds | F16L 27/042 | 285/271 |
| 1,784,926 A * | 12/1930 | Christenson | F16L 27/053 | 285/271 |
| 1,925,335 A * | 9/1933 | Demery | F16L 27/06 | 285/271 |
| 2,550,536 A * | 4/1951 | Delano, Jr. | F16L 27/053 | 285/267 |
| 2,564,938 A * | 8/1951 | Warren | F16L 27/047 | 285/918 |
| 3,276,796 A * | 10/1966 | Daniel | F16L 37/52 | 285/261 |
| 3,334,818 A * | 8/1967 | Moen | B05B 7/0425 | 239/431 |
| 3,454,288 A * | 7/1969 | Mancusi, Jr. | F16L 27/047 | 277/928 |
| 3,545,475 A | 12/1970 | Johnson et al. | | |
| 3,663,043 A * | 5/1972 | Walton | F16L 27/053 | 285/379 |
| 3,874,706 A * | 4/1975 | Arnold | F16L 19/08 | 285/24 |
| 3,931,992 A * | 1/1976 | Coel | F16L 27/073 | 285/271 |
| 4,040,650 A * | 8/1977 | Shotbolt | F16L 27/04 | 285/912 |
| 4,139,221 A * | 2/1979 | Shotbolt | F16L 37/52 | 285/271 |
| 4,180,285 A * | 12/1979 | Reneau | B23Q 1/545 | 285/276 |
| 4,298,219 A * | 11/1981 | Amelink | F16L 37/52 | 285/321 |
| 4,356,998 A * | 11/1982 | Bach | F16L 27/04 | 285/261 |
| 4,381,871 A * | 5/1983 | Dopyera | F16L 27/053 | 285/368 |
| 4,427,218 A * | 1/1984 | Duvet | F16L 37/002 | 285/341 |
| 4,618,173 A * | 10/1986 | Dopyera | F16L 27/053 | 285/263 |
| 4,671,543 A * | 6/1987 | Miliczky | F16L 27/04 | 285/288.11 |
| 5,048,873 A * | 9/1991 | Allread | F16L 27/04 | 285/261 |
| 5,127,681 A * | 7/1992 | Thelen | F16L 27/073 | 285/263 |
| 5,507,534 A * | 4/1996 | Reifenberger | F16L 27/04 | 285/271 |
| 5,658,022 A * | 8/1997 | Shi | F16L 27/047 | 285/261 |
| 5,975,588 A * | 11/1999 | Hesseln | F16L 27/06 | 285/263 |
| 6,454,313 B1 * | 9/2002 | Dawson, Jr. | F16L 27/047 | 285/334.3 |
| 6,705,647 B1 * | 3/2004 | Palmer | F16L 27/047 | 285/271 |
| 9,101,950 B2 * | 8/2015 | Espy | B05B 15/654 | |
| 9,127,794 B2 * | 9/2015 | Leber | B29C 66/54 | |
| 11,549,623 B2 * | 1/2023 | Wallace | F16L 27/06 | |
| 2001/0008256 A1 | 7/2001 | Marsh et al. | | |
| 2005/0093295 A1 | 5/2005 | Byerly | F16L 27/04 | 285/261 |
| 2010/0084856 A1 * | 4/2010 | Wrobel | F16L 19/025 | 285/108 |
| 2014/0110934 A1 * | 4/2014 | Berkness | F16L 27/04 | 285/231 |
| 2015/0285418 A1 * | 10/2015 | Rempert | F16L 23/036 | 285/412 |
| 2017/0074439 A1 * | 3/2017 | Marincic | F16L 27/04 | |

OTHER PUBLICATIONS

United Kingdom Search Report for GB187289.0 mailed Apr. 23, 2019 (5 pages).
https://web.archive.org/web/20161106105728/http://www.johnguest.com/product/polarclean/coaxial-keg-connector/.

* cited by examiner

COAXIAL BEVERAGE KEG CONNECTOR COMPRISING A BALL JOINT

This application is a National Stage Application of PCT/GB2019/052878, filed 10 Oct. 2019, which claims benefit of Serial No. 1817289.0, filed 24 Oct. 2018 in Great Britain and which applications are incorporated herein by reference. To the extent appropriate, a claim of priority is made to each of the above disclosed applications.

The present invention relates to a coaxial connector.

The connector comprises a main body made of plastic and having a first inlet port and a second inlet port receiving a stem, and a coaxial outlet comprising an outer outlet port in communication with the first inlet port and an inner outlet port in communication with the second inlet port, the stem comprising a tubular body with a main axis with an inlet and a connector for attachment to the keg at one end, the second end of the stem opposite to the first end having an outlet in fluid communication with the inner outlet port.

Such a connector will subsequently be described as being "of the kind described". The connector is specifically designed for kegs for carbonated beverages such as beer and cider, but could be used for any drink or liquid, or in hot water re-circulation systems.

A connector of the kind described is connected to a beer keg or the like in order to convey beer from the keg via a tubular pipeline leading to a beer tap, possibly via additional equipment such as a chiller. The first inlet port is connectable to a cooling water supply which leaves the connector via the outer outlet port. The stem is connected to the beer keg and the beer flows through the stem into the main body and leaves the connector via the inner outlet port. This flow is immediately surrounded by the flow of cooling water from the moment it leaves the connector such that the temperature of the beer can be precisely controlled. This is advantageous for a number of reasons. Firstly, it allows the temperature of the beer to be maintained at a constant temperature all the way from the connector to the beer tap. This is important as any "hotspots" promote the growth of bacteria. By being able to maintain the temperature of the beer below 3° at all times, the growth of bacteria can be suppressed. This provides a number of advantages including the fact that far less cleaning of the tubes is required, less frothing of the beer occurs at the tap, and the overall quality of the product delivered using a connector of this type is improved.

There is, however, a drawback with the existing connector. The connectors can be reasonably heavy as they are required to bear the weight of the tube with the coaxial flow. The weight is further increased by insulation surrounding the tube. The first end of the stem is typically connected via a threaded collar to a coupler. The coupler often has a bayonet mounting for mounting to the beer keg. The coupler also contains the main valve to control the flow of beer from the keg. The coupler is provided with a handle which is manually manipulated in order to open and close the valve.

When changing a barrel, the connector is not uncoupled from the coupler. Instead, the handle on the coupler is operated to close the valve to the keg. The coupler is then turned with respect to the keg to disengage the bayonet mounting. Once disengaged, the coupler and connector are removed together from the keg.

It happens reasonably often that an operator attempts to remove the coupler before having properly disconnected the bayonet mounting. When this happens, an unduly large upward force is applied to the stem. While this force is generally upward in nature, there will inevitably be a lateral component to the force which will tend to create stresses between the stem and the main body. The main body is typically made of a transparent plastic material (in order to allow the user to verify that the connection to the inner outlet port has been correctly made). This plastic is relatively brittle and therefore prone to cracking when the connector is subjected to the type of loading referred to below.

This is the problem addressed by the present invention.

According to the present invention, a connector of the kind described is characterised by the stem comprising a ball joint rotatably mounted in and sealed with respect to the main body so as to be rotatable about the main axis of the tubular body and rotatable to a limited extent about axes perpendicular to the main axis.

With the new design of coupling, most undue loadings of the kind described above will cause a relative rotational movement about an axis perpendicular to the main axis, but this relative rotation will not create any stresses between the stem and the main body in view of the presence of the ball joint. Given that the connectors are intended to be attached to a coupler throughout the lifetime of a coupler and hence are moved with the coupler from one keg to another, the present invention eliminates the main failure mode of the connector thereby significantly prolonging the lifetime of the connector.

The body preferably has a conical face to abut a side wall of the stem to limit rotation about axes perpendicular to the main axis. This provides a line contact between the two components thereby reducing any stress concentration between them. The main body preferably has a bearing face to abut a top of the stem to limit rotation about axes perpendicular to the main axis. In this case, the conical face and bearing face are configured to abut the stem simultaneously. Providing two regions of contact between the two components provides a stable engagement such that, even if further stresses are applied between the components, they are much more difficult to deform or dislodge. The conical face is preferably provided on an insert which retains the stem in the main body.

An example of a connector in accordance with the present invention will now be described with reference to the accompanying drawings in which.

Figure 1:
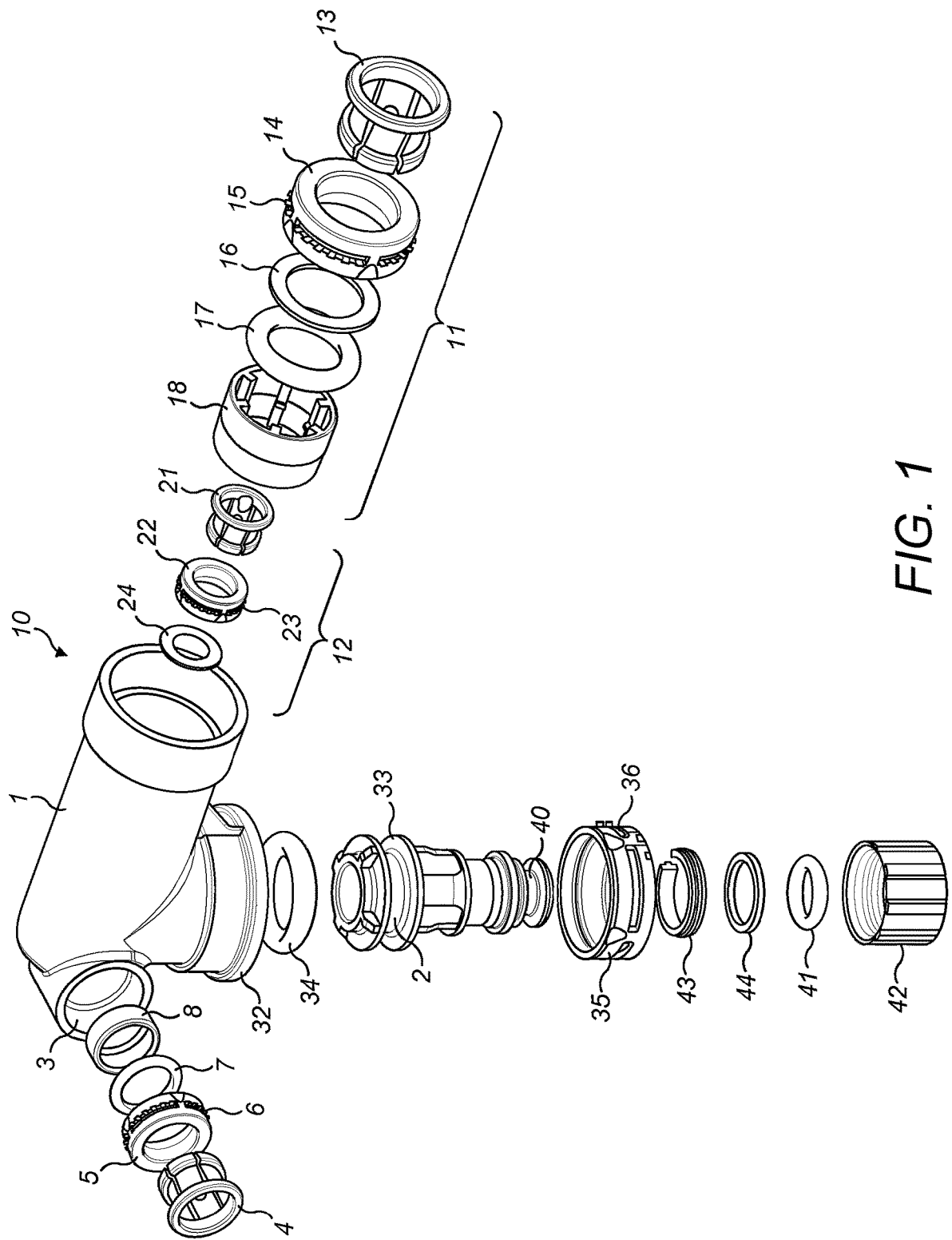
FIG. 1 is an exploded perspective of a prior art connector which has many components in common with the present invention.
Figure 2:
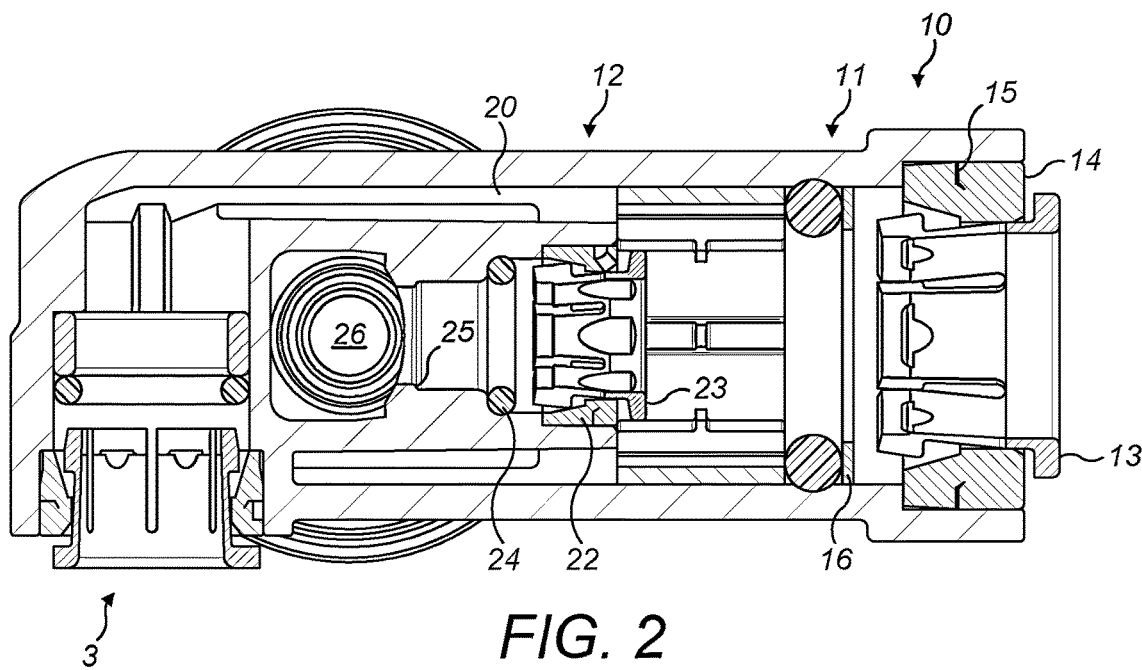
FIG. 2 is a cross section in a median horizontal plane of the connector of FIG. 1.

The prior art example of FIGS. 1 to 5 has many components in common with the present invention. The description below will therefore initially describe the conventional connector of FIGS. 1 to 5 and will then describe the differences of the present invention with reference to FIGS. 6 to 9.

The connector of FIGS. 1 to 5 comprises two main components, namely a main body 1 and a stem 2. The main body 1 is provided with a first inlet port 3 connected, in use, to a supply of cooling water. The first port 3 comprises a collet 4 to grip a tube for the water supply in a manner well known in the art. The collet 4 fits into a cartridge 5 provided with teeth 6 to grip within the main body. The connection is sealed by an O-ring 7 held in place by a spacer 8.

On the opposite end of the main body 1 is a coaxial outlet 10 comprising an outer outlet port 11 and an inner outlet port 12. The outer outlet port 11 is formed of a number of larger diameter components including collet 13, cartridge 14 with teeth 15, a spacer washer 16, larger diameter O-ring 17 and tube stop insert 18 which provides an end stop for the larger diameter O-ring, as well as shoulders 19 to receive a large diameter tube.

The large diameter tube is inserted through the collet 13 and lands on the shoulders 19. In this position, its outer diameter is sealed by the O-ring 17 and it is prevented from removal by the collet 13. This creates a flow path for coolant water from the inlet port 3 via outer flow path 20 and into the large tube.

The inner outlet port 12 is provided by smaller diameter components including collet 21, cartridge 22 with teeth 23 and O-ring 24. A smaller diameter tube (not shown) which is within the previously described large diameter tube is passed beyond the end of the larger diameter tube, through the collet 21 where it lands on a shoulder 25 within the main body. In this position, its outer diameter is sealed by the O-ring 24 and it is held in place by the collet 22. In this position, the inlet end of the smaller diameter tube is in communication with a flow passage 26 moulded into the main body. This passage is in flow communication with the stem 2 as described in greater detail below. In practice, the smaller diameter tube is connected before the longer diameter tube. The main body 1 is typically, but not always, transparent to provide visual confirmation to the user that the inner connection has been correctly made.

As described thus far, the inlet port 3 and coaxial outlet 10 and the various connections are the same between the prior art and the present invention. The difference concerns the manner in which the stem 2 is mounted within the main body 1.

The conventional stem 2 will be described below.

The stem 2 is a generally tubular component having an internal passage 30 extending along an axis 31. The top of the stem 2 is fitted into a second inlet port 32 on the lower side of the main body 1. The stem 2 is a tight fit within the body 1 so as to support the stem 2 in the position shown in FIG. 3. The stem is, however, rotatable about the main axis 31 (arrow R in FIG. 5) to allow some manipulation of the connector in a horizontal plane to accommodate alignment of the tubing connected to the various ports.

The upper end of the stem 2 is provided with a groove 33 to receive O-ring 34. This provides a seal between the stem 2 and the main body 1. The stem 2 is held in place within the main body 1 by a cartridge 35 provided with a plurality of teeth 36 which grip the main body. Inter-engaging shoulders on the stem 2 and cartridge 35 hold the stem in place.

At its lower end, the stem 2 is provided with a groove 40 to receive an O-ring 41 which provides a seal with a coupler as described below. A screw threaded nut 42 is held on the lower end of the stem 2 by a C-clip retaining ring 43 and a washer 44 is retained on a complimentary shoulder 45 within the stem.

Figure 5:
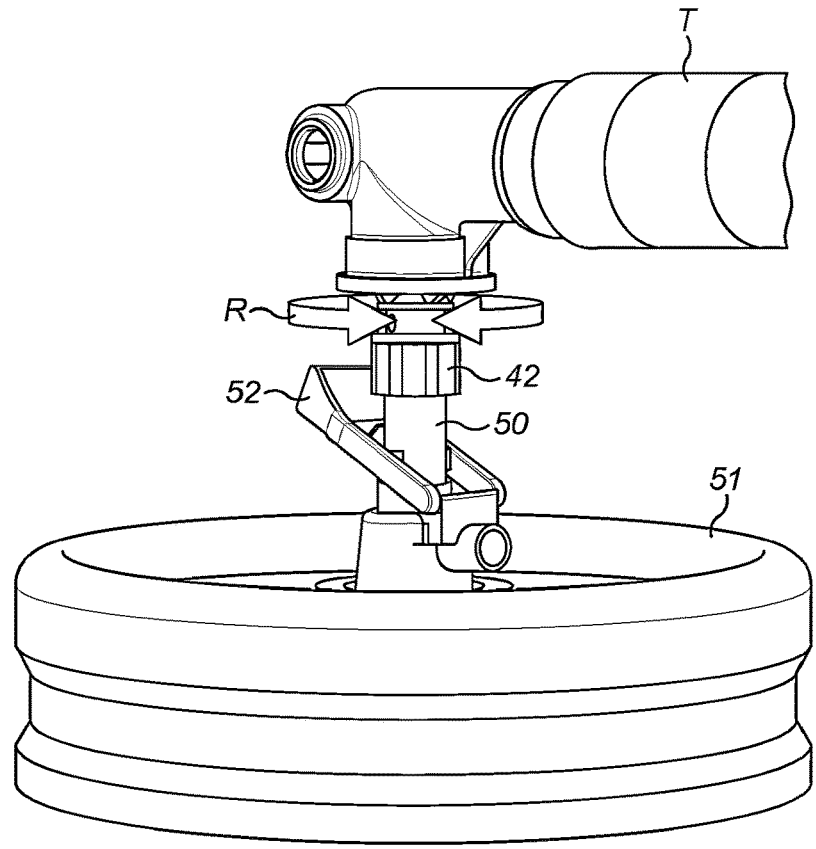
FIG. 5 is a perspective view showing the connection of the connector, coupler and keg.
Figure 6:
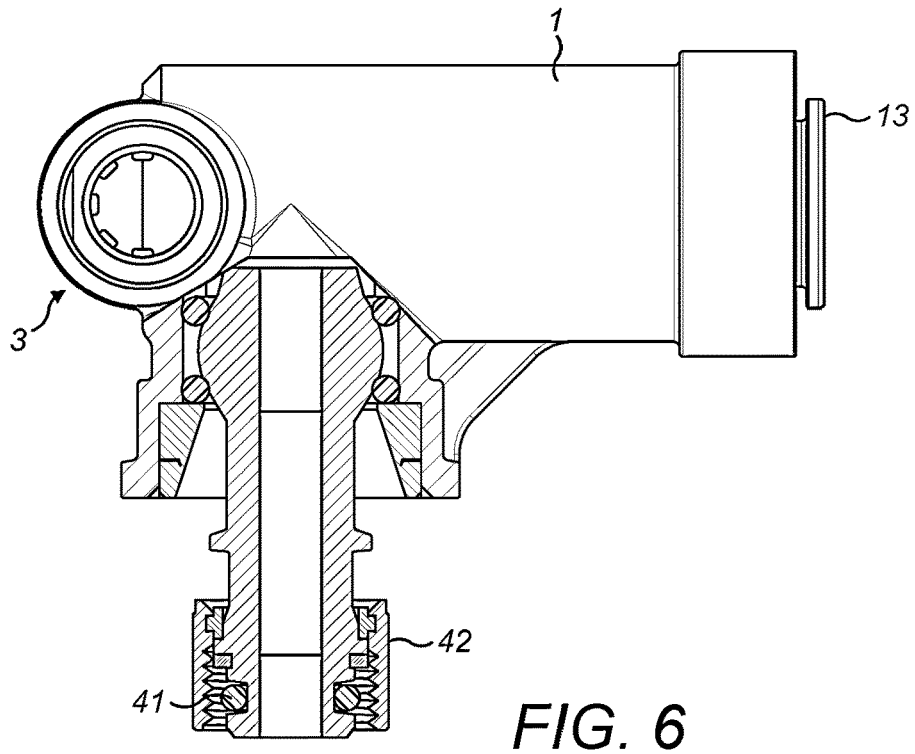
FIG. 6 is a view similar to FIG. 4 showing the present invention.
Figure 7:
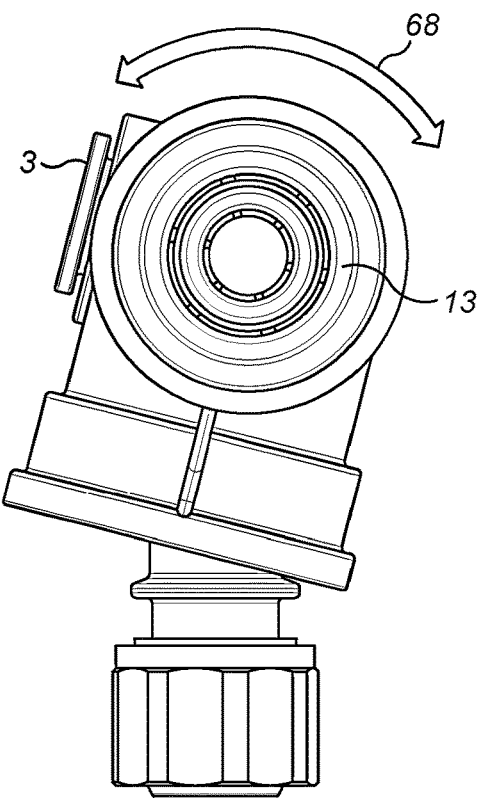
FIG. 7 is an end view of the connector in a first orientation.

In use, the nut 42 is screwed onto a coupler 50 as shown in FIG. 5. The end of the coupler seats on the washer 44 and the flow passage from the coupler into the stem 2 is sealed by O-ring 41 and washer 44.

In order to provide a flow from a keg 51 into the connector, a lever 52 is operated on the couple 50 in order to open a valve (not shown) in the keg. This creates the flow path from the keg, via the coupler into the stem 2. The flow path extends along the internal passage 30, into flow passage 26 and then into the small diameter tube as described above. At the same time, a flow of water is provided from the first inlet port 3 along outer flow path 20 and flows along the coaxial space between the small and large diameter tubes such that it surrounds the flow of beer even before it leaves the main body 1.

The nut 42 and the manner in which this is attached to the coupler as described below is again the same as between the prior art and the present invention.

The present invention relates to an improvement to the connection between the top of the stem 2 and the main body 1 and this will now be described with reference to FIGS. 6 to 9. All of the components which have already been described above and which are the same between the two examples have been designated with the same reference numerals in these figures and the description of the common components will not be repeated.

The stem 60 is provided at its upper end with a ball joint 61. This is fitted into the main body 1 and is sealed to the body by an upper O-ring 62 and lower O-ring 63. The stem 60 is held in place by a cartridge 64 which has teeth 65 which grip the main body 1 to hold the cartridge 64 in place. The cartridge 64 is positioned to retain the lower O-ring 63 in place and also has a small enough constriction that the ball joint 61 cannot pass through it.

Figure 8:
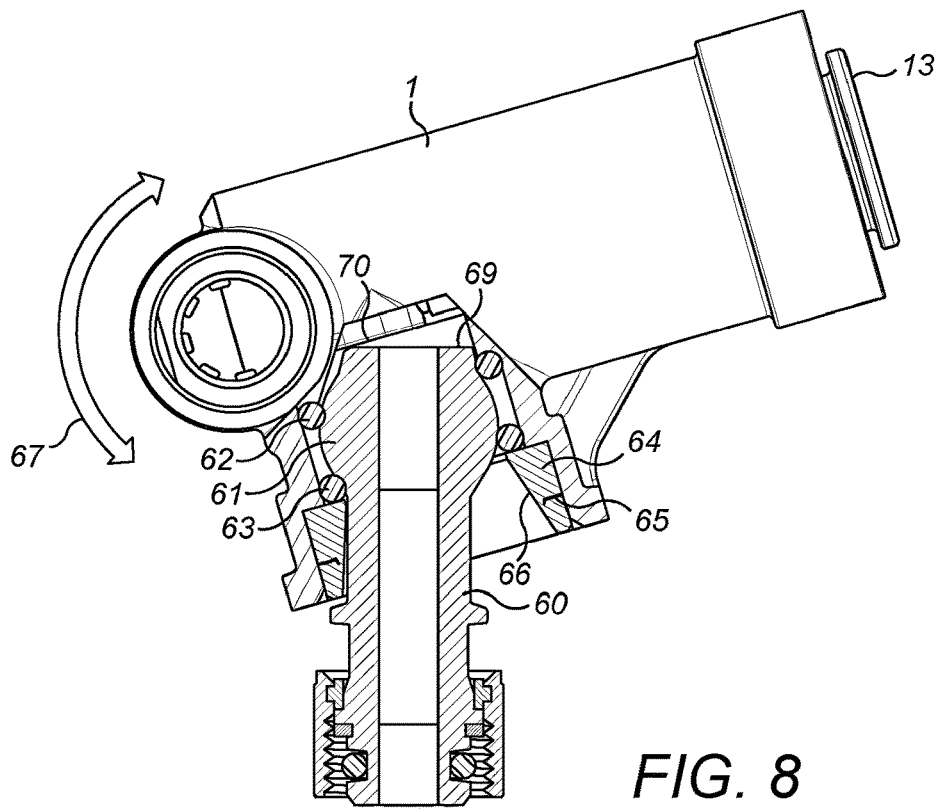
FIG. 8 is a side view of the connector in a second orientation.
Figure 9:
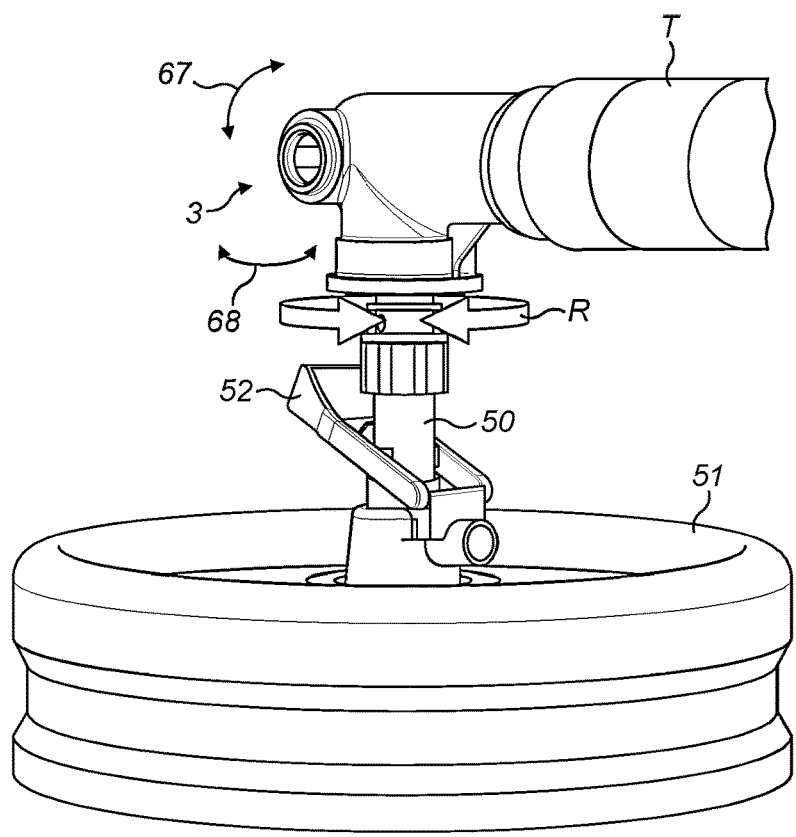
FIG. 9 is a view similar to FIG. 5 showing the present invention.

The inner face 66 of the cartridge 64 has a frusto-conical configuration. As best shown in FIG. 8, any rotation of the main body 1 about a horizontal axis as depicted by arrow 67 will not cause any stress between the main body 1 and the stem 60 as the two components are free to rotate via the ball joint 61 about this axis. Similarly, in relation to FIG. 7, the main body 1 is shown rotating about an orthogonal axis 68 where a similar degree of freedom is available.

As shown in FIG. 8, the top 69 of the stem 60 is positioned to come in contact with a bearing surface 70 within the main body 1 at the same time that a side wall of the stem 60 makes contact with the frusto-conical surface 66. This ensures that the stem 60 bears against the main body 1 in two discrete locations. This makes it far more difficult to stress or dislodge any of the components within the connector.

Figure 3:
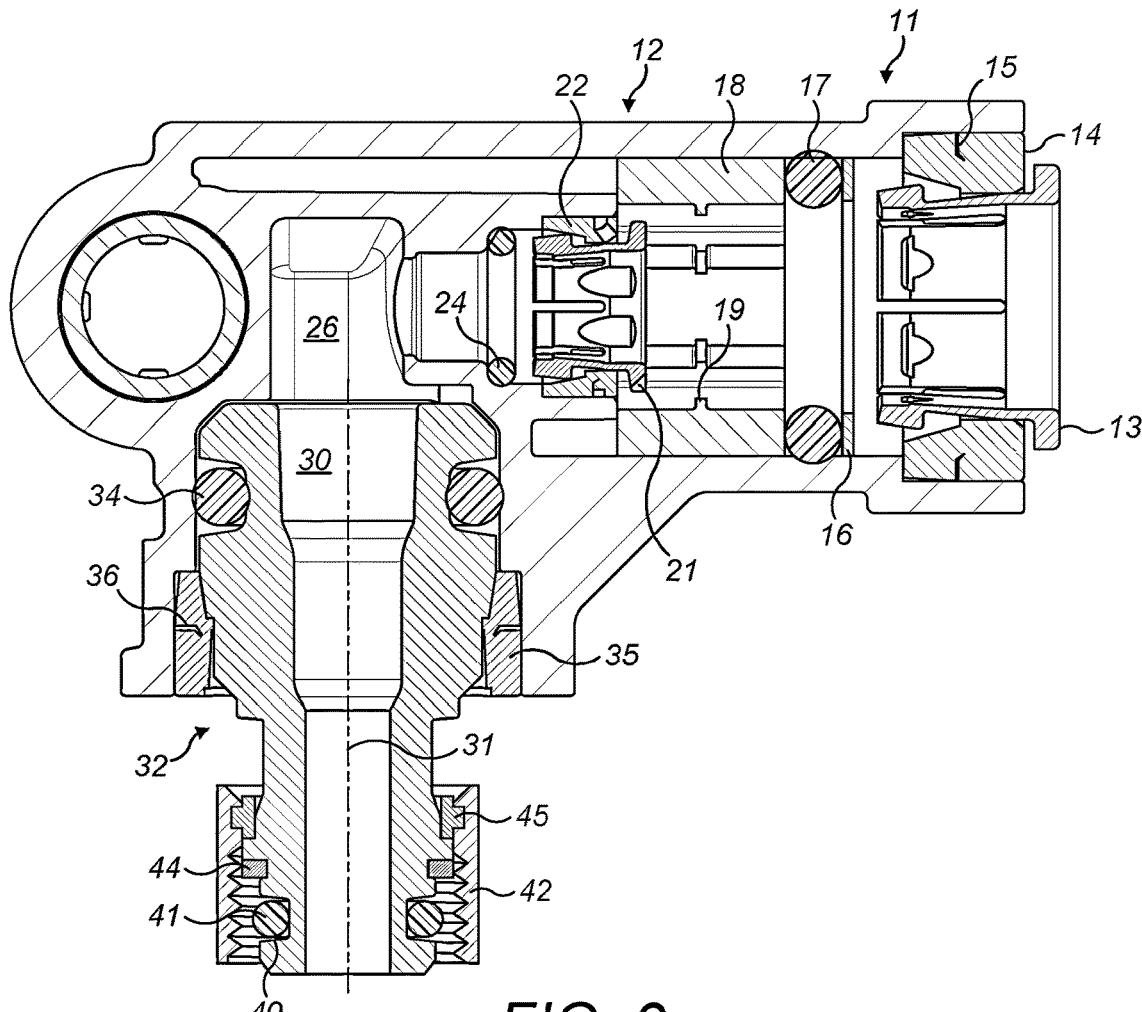
FIG. 3 is a cross section in a median vertical plane of the connector of FIG. 1.
Figure 4:
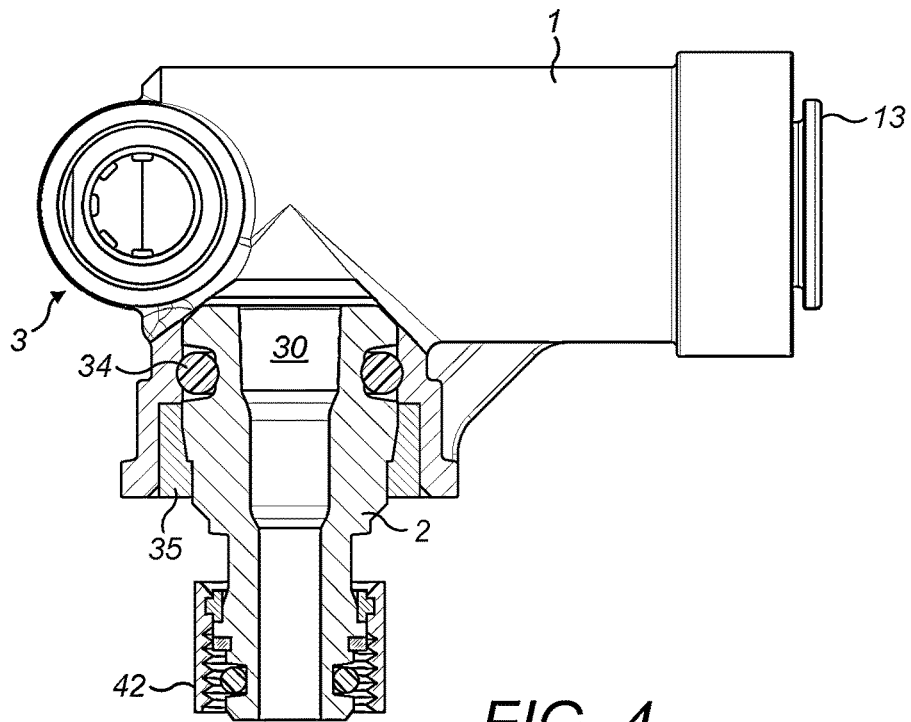
FIG. 4 is a partial cross section of the connector of FIGS. 1 to 3.

If, when carrying out the above described operation to move the coupler 50 from one barrel to another, a user should inadvertently attempt to lift the keg 51 via the connector 1 in a manner which will apply a significant degree of force onto the stem 60 by virtue of the fact that the keg is effectively suspended from the stem 60, any such force in the example shown in FIG. 3 which is out of a truly vertical plane would place significant stress on the interface between the stem 2 and main body 1. With the present invention, however, this is limited at least for the degree of freedom afforded by the rotational coupling provided by the ball joint 61. In practice, the angle of the frusto-conical surface 66 is configured such that this rotational joint should be able to accommodate all of the misalignment which will occur between the two components in the course of the changing of the keg, even when this is not quite done correctly as described above. In the event that a force is applied which tends to deflect the main body 1 beyond the position shown in FIG. 8 with respect to the stem 60, the manner in which the stem 60 is supported within the main body 1 as described above will reduce the possibility of any damage at this time.

The invention claimed is:

1. A coaxial keg connector comprising a main body made of plastic, wherein the main body includes an internal bearing surface, the main body having a first inlet port and a second inlet port receiving a stem, and the main body having a coaxial outlet comprising an outer outlet port in fluid communication with the first inlet port to create an outer flow path for coolant water and the coaxial outlet comprising an inner outlet port in fluid communication with the second inlet port, wherein a flow passage is moulded into the main body and is in flow communication with the stem at the second inlet port;

the stem comprising a tubular body having an internal passage in fluid communication with the flow passage of the main body, the internal passage being a through bore extending along a main axis with an inlet and a keg connector for attachment to the keg at a first end, a second end of the stem opposite to the first end having an outlet in fluid communication with the inner outlet port, and the stem further comprising a ball joint rotatably mounted in the main body of the coaxial keg connector and sealed with respect to the main body of the coaxial keg connector so as to be rotatable about the main axis of the tubular body and rotatable to a limited extent about axes perpendicular to the main axis;

wherein the ball joint includes a frustoconical outer surface extending from a non-frustoconical outer surface, wherein the frustoconical outer surface abuts the internal bearing surface of the main body of the coaxial keg connector simultaneously as a side wall of the tubular body of the stem contacts a frusto-conical face within the main body of the coaxial keg connector to limit rotation about the axes perpendicular to the main axis; and wherein the coaxial keg connector includes a plurality of seals including an upper sealing ring and a lower sealing ring, wherein the upper and lower sealing rings seal the ball joint with respect to the main body and provide a gap between the ball joint and an inner surface of the main body, each one of the upper and lower sealing rings contact both the outer surface of the ball joint and the inner surface of the main body of the coaxial keg connector.

2. The coaxial keg connector according to claim 1, wherein the frusto-conical face is provided on an insert which retains the stem in the main body of the coaxial keg connector.

3. The coaxial keg connector according to claim 1, wherein the first inlet port comprises a first collet configured, in use, to grip a tube that supplies the coolant water.

4. The coaxial keg connector according to claim 1, wherein the first collet fits into a first cartridge provided with teeth to grip within the main body of the coaxial keg connector, wherein a first O-ring is held in place by a first spacer to create a seal.

5. The coaxial keg connector according to claim 1, wherein the outer outlet port is formed with large diameter components including a second collet, a second cartridge with teeth, a second spacer washer, a second O-ring, and a first tube stop insert that provides an end stop for the second O-ring.

6. The coaxial keg connector according to claim 5, wherein the inner outlet port is formed with small diameter components including a third collet, a third cartridge with teeth, a third O-ring, and a second tube stop insert that provides an end stop for the third O-ring.

7. A coaxial keg connector comprising a main body made of plastic, wherein the main body includes an internal bearing surface, the main body having a first inlet port and a second inlet port receiving a stem, and a coaxial outlet comprising an outer outlet port in communication with the first inlet port and an inner outlet port in communication with the second inlet port;

the stem comprising a tubular body with a main axis with an inlet and a keg connector for attachment to the keg at a first end, a second end of the stem opposite to the first end having an outlet in fluid communication with the inner outlet port, and the stem further comprising a ball joint rotatably mounted in the main body of the coaxial keg connector and sealed directly to a portion of the main body of the coaxial keg connector;

wherein the ball joint of the stem is rotatable about the main axis of the tubular body and rotatable to a limited extent about axes perpendicular to the main axis;

wherein the ball joint includes a frustoconical outer surface extending from a non-frustoconical outer surface, wherein the frustoconical outer surface abuts the internal bearing surface of the main body of the coaxial keg connector simultaneously as a side wall of the tubular body of the stem contacts a frusto-conical face within the main body of the coaxial keg connector to limit rotation about the axes perpendicular to the main axis; and wherein the coaxial keg connector includes a plurality of seals including an upper sealing ring and a lower sealing ring, wherein the upper and lower sealing rings seal the ball joint with respect to the main body and provide a gap between the ball joint and an inner surface of the main body, each one of the upper and lower sealing rings contact both the outer surface of the ball joint and the inner surface of the main body of the coaxial keg connector.

8. The coaxial keg connector according to claim 7, wherein the frusto-conical face is provided on an insert which retains the stem in the main body of the coaxial keg connector.

9. The coaxial keg connector according to claim 7, wherein the outer outlet port is formed with large diameter components including a first collet, a first cartridge with teeth, a spacer washer, a first O-ring, and a first tube stop insert that provides an end stop for the first O-ring.

10. The coaxial keg connector according to claim 9, wherein the inner outlet port is formed with small diameter components including a second collet, a second cartridge with teeth, a second O-ring, and a second tube stop insert that provides an end stop for the second O-ring.

* * * * *